Jan. 10, 1933.  J. A. JENSEN  1,893,942
SAFETY VALVE FOR GASOLINE TANKS AND THE LIKE
Filed Sept. 28, 1929   2 Sheets-Sheet 1
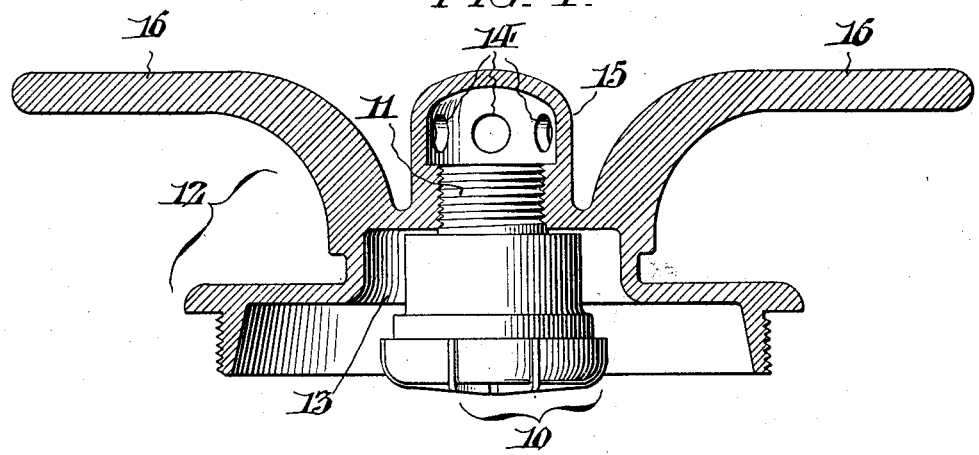
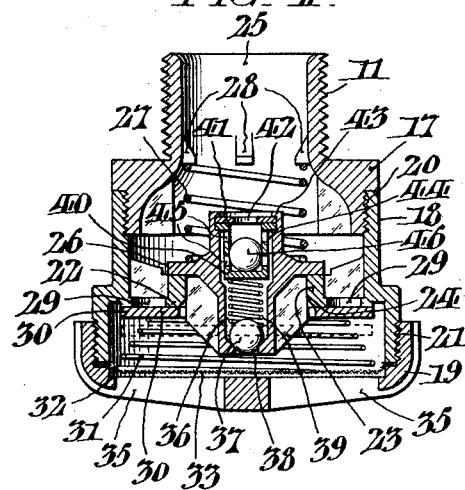
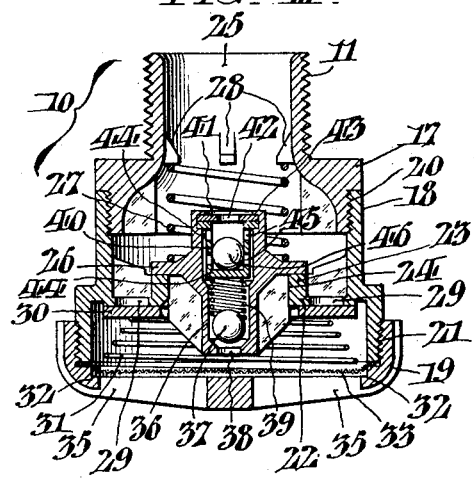
INVENTOR:
James A. Jensen,
BY
ATTORNEYS.

Jan. 10, 1933.　　　　J. A. JENSEN　　　　1,893,942
SAFETY VALVE FOR GASOLINE TANKS AND THE LIKE
Filed Sept. 28, 1929　　　2 Sheets-Sheet 2
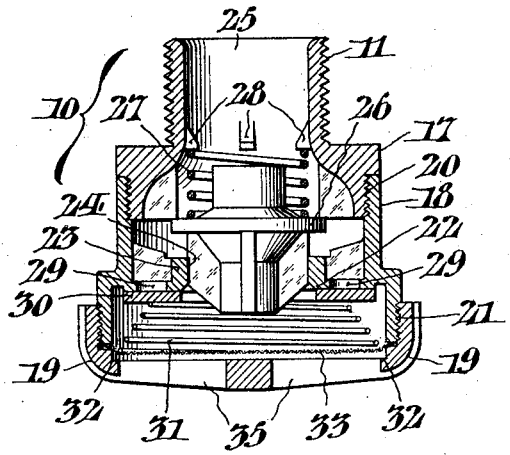
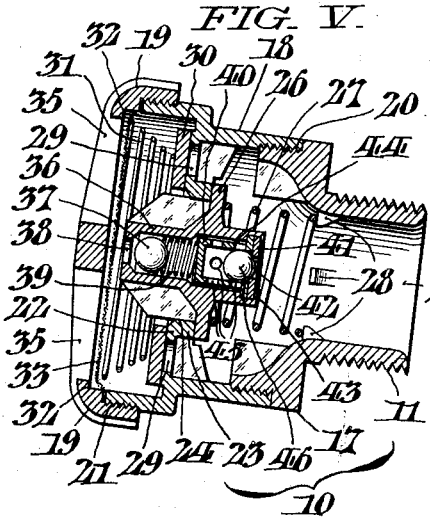 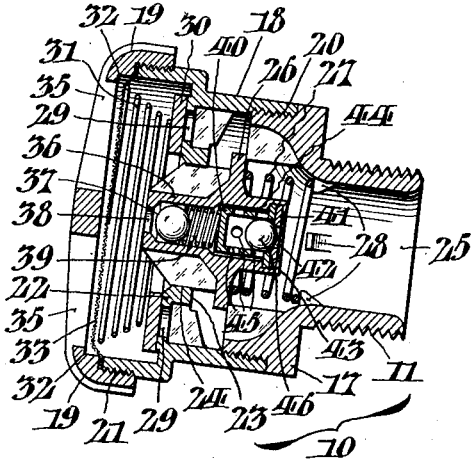
WITNESSES
INVENTOR:
James A. Jensen,
BY
ATTORNEYS.

Patented Jan. 10, 1933

1,893,942

UNITED STATES PATENT OFFICE

JAMES A. JENSEN, OF PHILADELPHIA, PENNSYLVANIA, ASSIGNOR TO QUAKER CITY IRON WORKS, OF PHILADELPHIA, PENNSYLVANIA, A CORPORATION OF PENNSYLVANIA

SAFETY VALVE FOR GASOLINE TANKS AND THE LIKE

Application filed September 28, 1929. Serial No. 395,777.

This invention relates to safety valves useful in connection with tanks for volatile and explosive liquids, more particularly tanks of cars or other vehicles employed in the transportation of gasoline or the like.

In safety valves of the kind referred to, as heretofore constructed, provisions were made for continuously venting the tanks to relieve gaseous pressure occasioned by agitation of the liquid contents of the tanks or by atmospheric changes, as well as to admit air during draining of the tanks, with attendant loss of considerable liquid through unrestrained evaporation. Moreover, to preclude building up of excessive pressures, and to prevent explosions in case of fire, it has been customary heretofore to equip such safety valves with fusible plugs designed to melt out in the presence of abnormal high temperatures. I have however found that unless subjected to the direct action of flame, these plugs would not fuse readily and therefore failed to afford the protection for which they were instituted.

Generally stated, my invention is directed toward overcoming the above recited and other deficiencies of previous practice in this art through provision of an automatically operative safety valve capable of normally maintaining a predetermined pressure within the tank sufficient to hold evaporation in check; adapted to relieve slight excess above such predetermined pressure as may be occasioned by surging of the liquid incident to transportation or to climatic fluctuations of temperature; having capacity to prevent voluminous evaporation due to extreme heat or fire even though not directly subjected to flame; designed to relieve gaseous tension incident to draining; and adapted to avoid spillage attendant upon surging of the liquid under normal conditions as well as in the event of accidental upsetting or overturning of the tank.

As a further protection against fire hazard, I moreover aim to prevent, through incorporation of a barrier in such valves, entry of flame into the tanks notwithstanding full valve opening for abnormal pressure relief as aforesaid.

Still other objects and inherent advantages of this invention will be manifest from the detailed description following of the typical embodiment shown in the drawings, whereof Fig. I is a sectional view of a tank cover fitted with my improved valve.

Figs. II, III, IV, V and VI are sectional views of the valve, on a somewhat larger scale than in Fig. I, showing how it functions under different conditions in service.

As herein delineated, the safety device or valve 10 of my invention embodies a hollow casing which is generally cylindric and formed at the top with a diametrically reduced threaded portion or neck 11 so as to be screwable, as shown in Fig. I, upward into the cover 12 for the filler opening of the tank with which the valve is to be used. In order that the valve 10 may be afforded complete protection against injury, the cover 12 is formed with an axial stepped recess 13 for its reception and housing; while communication is had with the exterior under the control of said valve, as hereinafter disclosed, by way of lateral openings 14 in an integral central dome 15 of said cover; while the lower diametrically reduced portion of said dome is screw-threaded, as shown, for secure retainment of the valve 10, in an obvious manner. To facilitate manipulation incident to application to the tank or its removal therefrom, the cover 12 is provided, after more or less customary practice, with a pair of oppositely extending grip handles 16.

The casing of the valve 10, it will be noted, is of multipartite construction—comprising, in the present instance, three components, to wit: a top section 17 which provides the threaded neck 11; a medial section 18 of annular configuration; and a bottom section 19 having the form of a cap, said sections being continuously interconnected by screw threading at 20 and 21. The medial casing section 18 is spanned by a cross web 22 with an upstanding flange 23 that serves as a seat about a central port 24. This port 24 constitutes the high pressure relief passage of the valve 10, and will be observed as substantially equal in area to the opening 25 through the neck 11 of the valve casing. The port 24 is controlled by a closure member 26 which is urged into contact with the seat 23 by a comparatively heavy compression spring 27 whereof the upper end abuts against inwardly projecting lugs 28 internally of the casing section 17. The cross web 22 is moreover provided with other ports or apertures 29 which are serially arranged circumferentially around the main central port 24 and adapted to be governed by a suction responsive disk 30, the latter being subject to the upward pressure of a comparatively light volute spring 31. As shown, this spring 31 rests on an internal peripheral shoulder 32 of the lower cap-like section 19 of the valve 10, which section further serves to secure a screen 33 transversely of the diametrically enlarged open bottom end of the medial casing section 18. This screen 33 functions as a barrier to prevent passage of flame through the valve 10 from the exterior, and is protected against injury by radial ribs 35 extending crosswise of the opening through the casing section 19. Low pressure relief, on the other hand, takes place through the closure member 26 which is accordingly bored axially as at 36. The flow through the bore 36 is controlled by a ball 37 urged toward a small aperture 38 at the bottom by a spring 39, said spring being buttressed at its upper end by a thimble-like retainer 40 fitted into the top of said bore. A disk 41 with a central orifice 42 is superposed upon the circumferentially flanged top end of the retainer thimble 40, and permanently secured to hold said thimble in place, by inward joggling of the edge around the upper end of the bore 36 as at 43. As shown, the body of the thimble 40 is smaller in diameter than the bore, with consequent provision of a circumferential interval 44 thereabout by way of which fluid passing the ball 37 escapes through apertures 45 in the sides of the thimble 40 and the orifice 42 in the disk 41. Under certain conditions, also hereinafter explained, a gravity ball 46 free to move within the thimble 40 operates to prevent outflow of the liquid contents of the tank, with which the valve 10 is associated, through the opening 42.

Normally all of the passages through the valve 10 are closed as shown in Fig. II, a slight pressure being maintained in the tank to restrain evaporation to a minimum, such pressure being obviously determined by the resistance of the spring 39 which acts upon the ball 37. In case of valves 10 intended for gasoline tanks, the indicated desideratum is attained by designing the spring 39 so that it will yield when the pressure rises above one pound per square inch. Accordingly, when this predetermined pressure is exceeded slightly due to surging of the liquid in the tank or to climatic changes, the ball 37 is lifted as shown in Fig. III, thereby permitting the excess gas to escape through the devious passages within the closure member 26, to the avoidance of any splashing of liquid from the tank.

During draining of the tank, the gaseous tension above the liquid is relieved through automatic action of the annular disk 30 which responds to being drawn downwardly away from the cross web 22 in the valve 10 as shown in dotted lines in Fig. II, thereby permitting air to enter through the apertures or ports 29.

In the event of abnormal evaporation of the tank contents due to fire, the closure member 26 is lifted from its seat on the upstanding flange 23 as shown in Fig. IV, in opposition to the spring 27 which, for the purposes of valves for gasoline tanks such as ordinarily employed on cars or trucks, is designed to yield at six pounds per square inch, so that the entrained pressure may freely escape through the main central port 24 and thus offset the possibility of explosions. Notwithstanding full opening of the closure member 26 under the conditions just described, flame is prevented from entering the tank by the barrier screen 33, the latter thereby functioning as an auxiliary safeguard against fire hazards. In view of the fact that the operation of the high pressure relief means, i. e. the closure member 26, is not solely dependent upon direct flame action, it is obviously more reliable than the fusible plugs heretofore relied upon to serve in a similar protective capacity.

In case of upsetting of the tank with inversion of the valve 10, the ball 46 free within the thimble 40 is influenced by gravity and rolls into position over the opening 42 in the disk 41, as shown in Fig. V. In this way it will be seen that the contents of the tank are prevented from spilling out through the valve 10 even though the ball 37 should be lifted to uncover the low pressure relief port 38 in the closure member 26. The pressure due to the head of gasoline in tanks, of the kind variously referred to herein, is never more than three pounds per square inch, so that, incident to the contingency under immediate discussion, the closure member 26 will not be displaced from its seat on the flange 23 unless upsetting of the tank is attended by fire when it will function after the manner shown in Fig. VI.

By virtue of being located within the cover 12 instead of at the exterior after common practice, the valve 10 is protected against breaking off and allowing the gasoline to escape in the event of accidental upsetting and rolling over of the tank.

Having thus described my invention, I claim:

1. In a safety valve for use in connection with tanks for gasoline and the like, the combination of a hollow casing comprising continuously-interconnected hollow sections, a normally closed high pressure relief member in a medial section thereof and capable of yielding to extreme pressures induced by evaporation incident to abrupt rises in temperature, and an independently-operative normally-closed low pressure spring-influenced ball relief housed within an axial bore in the member aforesaid and functional ordinarily in maintaining a comparatively light predetermined pressure sufficient to hold evaporation in check, but capable of yielding to slight increases due to surging of the liquid in the tank or to climatic changes in excess of such predetermined pressure.

2. In a safety valve for use in connection with tanks for gasoline and the like, the combination of a hollow casing comprising top, medial and bottom continuously-interconnected sections, a normally closed axially-bored member including aligned spring and gravity-influenced ball relief valves, the spring-influenced ball relief valve being capable of yielding to pressure induced by evaporation in excess of a predetermined amount, and a suction responsive spring-influenced annular relief member in the lower section that permits influx of air incident to draining of the tank.

3. In a safety valve for use in connection with tanks for gasoline and the like, the combination of a hollow casing including top, medial and bottom continuously-interconnected sections, a normally closed high pressure spring-influenced axially-bored plunger relief valve in the medial section capable of yielding to extreme pressures induced by evaporation incident to abrupt rises in temperature, an independently operative normally-closed spring-influenced low pressure relief ball valve housed within the axially bored valve and functional ordinarily in maintaining a comparatively light predetermined pressure sufficient to hold evaporation in check, but capable of yielding to increases due to surging of the liquid in the tank or to climatic changes in excess of such predetermined pressure, and a suction responsive spring-influenced annular relief valve permitting influx of air incident to draining of the tank.

4. In a safety valve for use in connection with tanks for gasoline and the like, the combination of a hollow casing including top, medial and bottom continuously-interconnected sections, a normally-closed low pressure spring-influenced ball relief valve housed in an axially-bored closure member within the medial section and functional ordinarily in maintaining a comparatively light predetermined pressure sufficient to hold evaporation in check but capable of yielding to slight increases, due to surging of the liquid in the tank or to climatic changes in excess of such predetermined pressure, and an aligned gravity-influenced ball valve housed in a perforate thimble-like retainer fitting the upper end of the closure member aforesaid and adapted to prevent spillage upon accidental overturning of the tank, notwithstanding opening of the low pressure relief valve aforesaid.

5. In a safety valve for use in connection with tanks for gasoline and the like, the combination of a hollow casing comprising top, medial and bottom continuously-interconnected sections, a normally closed plunger-like axially-bored relief means afforded guidance in a cross web having a tubulate flange in the medial section aforesaid and capable of yielding to extreme pressures due to evaporation in excess of a predetermined amount, an independently operative suction responsive spring-influenced annular disk relief valve coacting with the cross web and permitting influx of air incident to draining of the tank, and a barrier in the bottom section of the safety valve to prevent passage of flame into the interior of the tank in the event of fire with the plunger-like relief means aforesaid open.

6. In a safety valve for use in connection with tanks for gasoline and the like, the combination of a hollow casing comprising top, medial and bottom continuously-interconnected sections, a normally closed axially-bored plunger-like high pressure relief valve afforded guidance in a perforate cross web having a tubulate flange integral with the medial section aforesaid, said valve being capable of yielding to extreme pressures induced by evaporation incident to abrupt rises in temperature, and an independently operative normally closed low pressure ball valve mounted by a perforate thimble in said axial bore functional ordinarily in maintaining a comparatively light predetermined pressure sufficient to hold evaporation in check, but capable of yielding to slight pressure increases due to surging of the liquid in the tank or to climatic changes in excess of such predetermined pressure, and a barrier screen clamped in the bottom section of the safety valve below the relief means to prevent passage of flame into the interior of the tank in the event of fire with either of the aforesaid relief means open.

7. In a safety valve for use in connection with tanks for gasoline and the like, the combination of a hollow casing comprising top, medial and bottom continuously-interconnected sections, a plunger-like axially-bored closure member afforded guidance in a perforate cross web embodying a tubulate flange integral with the medial section aforesaid and capable of yielding to extreme pressures induced by evaporation incident to abrupt rises in temperature, and an independently operative normally closed low pressure spring-influenced ball valve retained in the axial bore of the closure member aforesaid by means of a perforate thimble containing a gravity-influenced ball relief, said low pressure spring-influenced ball valve being functional ordinarily in maintaining a comparatively light predetermined pressure sufficient to hold evaporation in check, but capable of yielding to slight increases due to surging of the liquid in the tank or to climatic changes in excess of such predetermined pressure.

8. In a safety valve for use in connection with tanks for gasoline and the like, the combination of a hollow casing comprising top, medial and bottom continuously-interconnected sections, a spring-influenced plunger-like closure afforded guidance in a perforate cross web embodying a tubulate flange integral with the medial section aforesaid and capable of yielding to extreme pressures induced by evaporation incident to abrupt rises in temperature, an independently operative normally closed spring-influenced low pressure relief ball valve in the plunger-like closure aforesaid, a perforate thimble-like retainer limiting actuation of the relief ball valve and containing a gravity influenced accidental liquid outflow control element, said spring-influenced ball valve being functional ordinarily in maintaining a light predetermined pressure sufficient to hold evaporation in check, but capable of yielding to slight increases due to surging of the liquid in the tank or to climatic changes in excess of such predetermined pressure maintained, and a spring-influenced annular disk valve independent of either of the aforesaid pressure relief valves capable of responding to suction incident to draining of the tank.

9. In a safety valve adapted for use in connection with tanks for gasoline and the like, the combination of a spring-influenced plunger-like closure member having an axial bore and capable of yielding to extreme pressures induced by evaporation incident to abrupt rises in temperature, an independently operative normally closed spring-influenced low pressure relief ball valve housed in the aforesaid closure member bore and functional ordinarily in maintaining a compartively light predetermined pressure sufficient to hold evaporation in check, but capable of yielding to slight increases due to surging of the liquid in the tank or to climatic changes in excess of such predetermined pressure, and a gravity-influenced ball valve housed in a perforate thimble secured in the closure member bore above the low-pressure relief valve to prevent spillage in the event of accidental overturning of the tank notwithstanding opening of said low pressure relief means.

10. In a safety valve for use in connection with tanks for gasoline and the like, the combination of a multipartite continuously-interconnected hollow body having a cross web in an intermediate section with a series of apertures around a main port afforded by a central tubulate flange, a normally seated plunger-like closure member afforded guidance in the tubulate flange capable of yielding to relieve pressure through said main port, and an independently-operative normally closed annular spring-influenced closure member coacting with the web perforations capable of yielding to suction to permit influx of air through the apertures aforesaid incident to draining of the tank.

In testimony whereof, I have hereunto signed my name at Philadelphia, Pennsylvania, this 25th day of September, 1929.

JAMES A. JENSEN.